Dec. 14, 1943.   P. BOURQUE   2,336,712
ELECTRODE HOLDER
Filed Oct. 27, 1941   3 Sheets-Sheet 1

Inventor
PHILIP BOURQUE
By Thos. Donnelly
Attorney

Dec. 14, 1943.    P. BOURQUE    2,336,712
ELECTRODE HOLDER
Filed Oct. 27, 1941    3 Sheets-Sheet 2

Inventor
PHILIP BOURQUE
By Thos. Donnelly
Attorney

Dec. 14, 1943.  P. BOURQUE  2,336,712
ELECTRODE HOLDER
Filed Oct. 27, 1941    3 Sheets-Sheet 3

Inventor
PHILIP BOURQUE
By Thos. Donnelly
Attorney

Patented Dec. 14, 1943

2,336,712

UNITED STATES PATENT OFFICE 2,336,712

ELECTRODE HOLDER

Philip Bourque, Detroit, Mich., assignor to Borden Mfg. Co., Inc., Detroit, Mich., a corporation of Michigan Application October 27, 1941, Serial No. 416,639

12 Claims. (Cl. 219—8)

My invention relates to a new and useful improvement in an electrode holder adapted for holding an electrode during an arc welding operation.

It is an object of the present invention to provide a holder of this class wherein a pair of rockable clamping jaws may be mounted on an insulated handle with the pivot means enclosed within the handle and provided with an actuating mechanism whereby the jaws may be rocked to closed position.

Another object of the invention is the provision of an electrode holder having a handle comprising a pair of relatively movable parts and provided with a mechanism so arranged that upon a movement of the handle parts relative to each other to a predetermined position, a pair of clamping jaws may be rocked into clamping position.

Another object of the invention is the provision, in an electrode holder of this class, of a pair of rockably mounted clamping jaws pivoted intermediate their ends and engaged, adjacent their rear ends, with an axially movable wedge member for forcing, through a relative movement of the rear ends of the jaws, a movement of the forward ends of the jaws into clamping relation.

Another object of the invention is the provision, in an electrode holder, having a pair of clamping jaws pivoted intermediate their ends, of a handle section carrying a wedge member and so arranged that when moved axially the wedge member may engage the rear ends of the jaws and force them into clamping relation.

Another object of the invention is the provision in an electrode holder, of a pair of pivotally mounted clamping jaws for clamping an electrode therebetween, adjacent one end and provided with a spring normally tending to retain said jaws in separated relation.

Another object of the invention is the provision of an electrode holder having a handle comprising a forward section and a rear section with a supporting mechanism mounted in the forward section for maintaining a pair of clamping jaws in rockable relation to each other and having, in the rear section of the handle, a mechanism for moving said jaws into clamping relation. Other objects will appear hereinafter.

It is recognized that various modifications and changes may be made in the detail of structure illustrated and it is intended that such changes and modifications may be brought within the scope of the claims appended hereto and forming a part hereof.

Forming a part of the specification are drawings in which.

Figure 1:
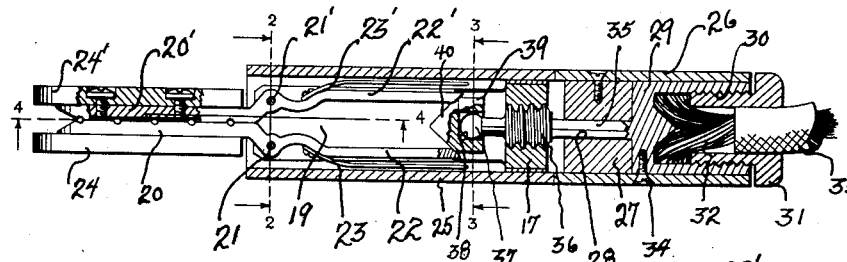
Fig. 1 is a longitudinal, central, vertical, sectional view of the invention showing parts in side elevation and with parts broken away.
Figure 2:
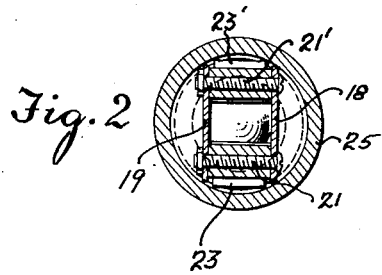
Fig. 2 is a sectional view taken on line 2—2 of Fig. 1, slightly enlarged.
Figure 3:
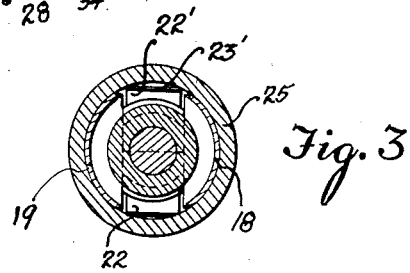
Fig. 3 is a sectional view taken on line 3—3 of Fig. 1, slightly enlarged.
Figure 4:
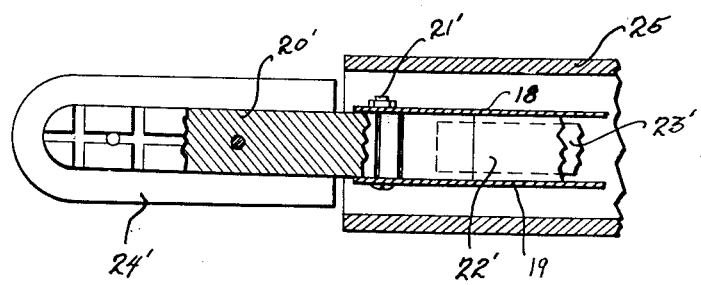
Fig. 4 is a fragmentary, slightly enlarged sectional view taken on line 4—4 of Fig. 1.
Figure 5:
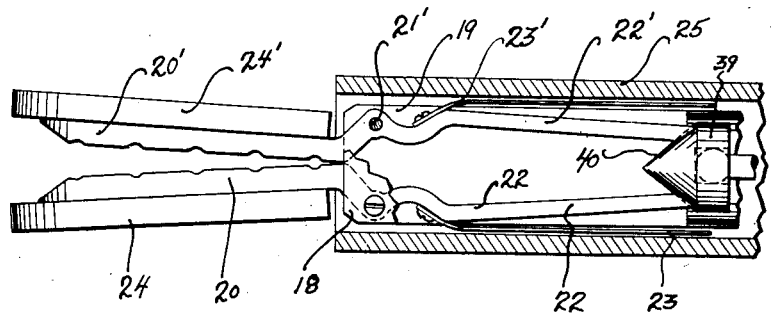
Fig. 5 is a view similar to Fig. 1 showing a fragment of the invention slightly enlarged with the jaws in open position.

As shown in Fig. 1 I have illustrated the invention embodying a nut-forming member 17 projecting forwardly from which are side plates 18 and 19. A pair of clamping jaws formed from suitable metal and having the forward ends 20 and 20' is pivotally mounted by means of the pins 21 and 21' on and between the plates 18 and 19. The rear ends 22 and 22' of these jaws project rearwardly from the point of pivot. Mounted on the jaws 22 and 22' respectively are the springs 23 and 23', these springs being attached at one end to the rear ends 22 and 22' of the jaws and adapted normally to spring outwardly therefrom. Mounted on the forward ends 20 and 20' of these clamping jaws are plates 24 and 24' of suitable insulating material. I provide a handle formed from suitable insulating material such as fibre or the like, and this handle comprises the forward section 25 and the rear section 26. The nut 17 is fixedly mounted in the forward section 25 so that the points of pivot of the jaws are contained within the handle section 25. Fixedly mounted in the rear handle section 26 is a guide block 27 having a flat faced passage or bore 28 formed therethrough. A well or socket-bearing member 29 engages in the section 26 provided with the internally threaded socket 30 in which may be threaded a jamb-nut 31 for clamping the bared end 32 of an electric conductor or cable 33 in the well. Suitable screws 34 serve to secure the well 29 in the handle section 26 in fixed relation thereto.

Projecting upwardly from and preferably integral with the well 29 is a flat faced stem 35 carrying the screw 36 which threads through the nut 17. Carried by this screw 36 and positioned forwardly thereof is a substantially spherical head 37 which engages in a cavity 38 formed in a spreader block 39 which is provided on its forward face 40 with an inclined surface so that as the spreader block 39 is thrust forwardly into engagement with the rear ends 22 and 22' of the jaws, these rear ends will be forced into separated relation against the compression of the springs 23 and 23' and the forward ends 20 and 20' of the jaws will be moved into engaging position.

The construction is such that the current carried by the cable 33 will be transmitted through the well 29, the stem 35 and the screw 36 to the nut 17 and from the nut 17 through the pivot members 21 and 21' to the clamping jaws This current will also be transmitted through the bowl 37 and the block 39 to the rear ends 22 and 22' of the jaws.

In order to move the jaws into clamping relation, as shown in Fig. 1, it is necessary for the operator to hold the forward section 25 of the handle while rotating the rear section 26 into which it is directed. This will thread the screw 36 into the nut 17 and force the spreader block forwardly of the rear ends 22 and 22' of the jaws, thus spreading the rear ends apart and forcing the forward ends 20 and 20' into clamping relation. When the rear section 26 of the handle is relatively rotated in the opposite direction the spreader block 39 will move to the right of Fig. 1, thus allowing the rear ends 22 and 22' of the jaws to move toward each other in response to the pressure of the springs 23 and 23', causing the forward ends 20 and 20' of the jaws to spread apart.

It will be noted that all of the mechanism is enclosed by an insulating handle, except that part of the jaws which grips the electrode. It will be noted also that the point of pivot is within the tube or forward section 25 of the handle and that the spring serves to move the clamping jaws apart instead of together. The springs 23 and 23' normally bear against the inner surface of the handle section 25.

Figure 6:
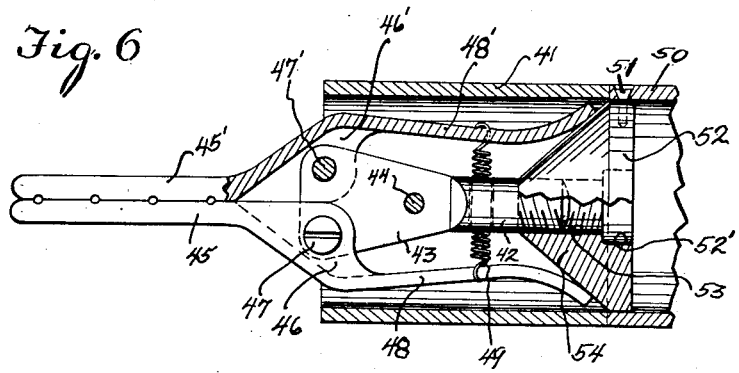
Fig. 6 is a fragmentary, longitudinal, vertical, sectional view of a modified form of the invention.

In Fig. 6 I have shown a slightly modified form of construction in which a forward handle section 41 is provided. A rod or stem 42 is provided at its forward end with the supporting head 43. A pin 44 extends through this head 43 and serves to retain at in fixed relation relatively to the forward handle section 41. A pair of clamping jaws 45 and 45' is provided which extend forwardly of the forward handle section 41 and which are provided with the lugs 46 and 46' respectively through which extend pivot pins 47 and 47' respectively for pivotally mounting these clamping jaws on the head 43. The rear ends 48 and 48' of these clamping jaws embrace and extend beyond the threaded portion of the stem 42. A spring 49 is connected to the rear ends 48 and 48' of the clamping jaws and tends normally to separate the forward ends 45 and 45' of these clamping jaws.

A rear handle section 50 is provided and mounted in this handle section 50 is a spreader head 52 secured in fixed relation thereto by the screw 51. This spreader head 52 is provided with a suitable socket 52' in which the end of an electric conductor may be secured by soldering or in any other suitable manner. The forward part of the spreader head 52 is formed conical to provide the spreader portion 54 which extends between the rear ends 48 and 48' of the jaws. Formed through this conical portion 54 is a threaded bore 53 into which the threaded portion of the stem 42 threads. The construction is such that as the handle section 50 is rotated relatively to the handle section 41 in one direction, the cone part 54 of the spreader block 52 will move inwardly of the rear ends 48 and 48' of the jaws and serve to spread them apart against the tension of the spring. The reverse movement of the parts 50 and 41 will cause the cone to retract, thus permitting the spring 49 to move the rear ends 48 and 48' inwardly of each other to spread the clamping ends 45 and 45' apart. As the rear ends 48 and 48' move toward each other they will, of course, ride along the inclined face 54 of the spreader block 52 so that contact will be maintained therewith. It will be noted that the rear ends 48 and 48' extend beyond the end of the threaded portion of the stem 42 so that contact of the arms 48 and 48' with the face of the spreader block 52, which is of course formed from contacting material, will be maintained until the member 52 is threaded off of the stem 42. Thus the likelihood of having an arc within the holder is eliminated.

Figure 7:
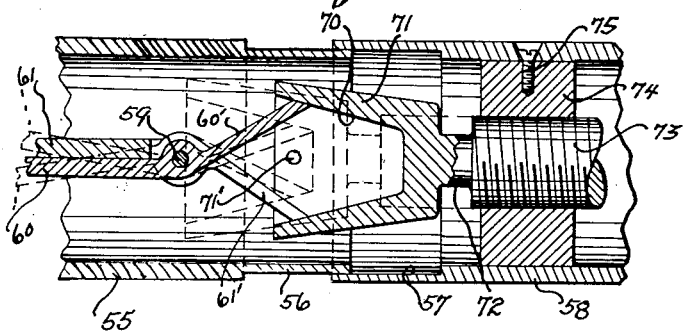
Fig. 7 is a fragmentary, longitudinal, central, sectional view of a further modified form of the invention.
Figure 8:
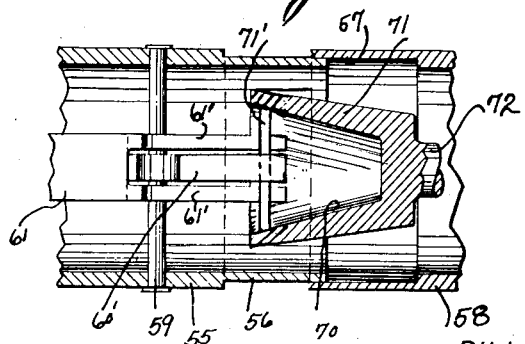
Fig. 8 is a view similar to Fig. 7 taken at right-angles thereto.

In Fig. 7 I have indicated a different form of construction in which I use a forward handle section 55 having the reduced portion 56 adapted to ride in the cut-away portion 57 of the rear handle section 58 so that these handle sections overlap each other. Pivotally mounted by the pin 59 to the forward handle section 55 are clamping jaws having the forwardly projecting clamping ends 60 and 61 and the rear ends 60' and 61' respectively. It will be noted that in the form illustrated in Fig. 1 and in Fig. 6 the jaws do not cross each other. In the form illustrated in Fig. 7 and in Fig. 8, however, the jaws do cross each other. In the form shown in Fig. 1 and Fig. 6 when the rear ends of the jaws are spread apart the forward ends are moved into clamping relation. In the form shown in Fig. 7 when the rear ends 60' and 61' are spread apart, the forward ends of the jaws also spread apart and when the rear ends 60' and 61' are moved into approach, the forward or clamping ends 60 and 61 also move into approach. A hollow spreader head 71 is provided having the inclined inner surface 70 or cavity formed in the head 71. Projecting into this cavity are the rear ends 60' and 61' of the jaws. This head 71 carries a rearwardly projecting stem 72 with a threaded portion 73 threaded through the nut 74 which is fixed by the screw 75 to the rear handle section 58. A rod 71' extended through the cavity of the head 71 serves to prevent rotation of this head relative to the rear ends of 60 and 61' of the jaws beyond a predetermined limit. The stem 73 is suitably connected in any desired manner by soldering or by a mechanical connection as shown in Fig. 1 to an electric conductor. The construction is such that as the handle sections 55 and 58 are rotated relatively to each other in one direction the head 71 will move farther on—to the rear ends 60' and 61' of the jaws, forcing these rear ends together and thereby moving the forward ends 60 and 61' toward each other to clamping relation with an electrode placed therebetween. The reverse rotation of the sections 58 and 55 will permit the ends 60 and 61 of the jaws to be spread apart. It will be noted that when unthreaded the handle sections 58 and 55 will disengage each other before the head 71 disengages the ends 60' and 61', thus eliminating a possibility of arcing within the handle.

Figure 9:
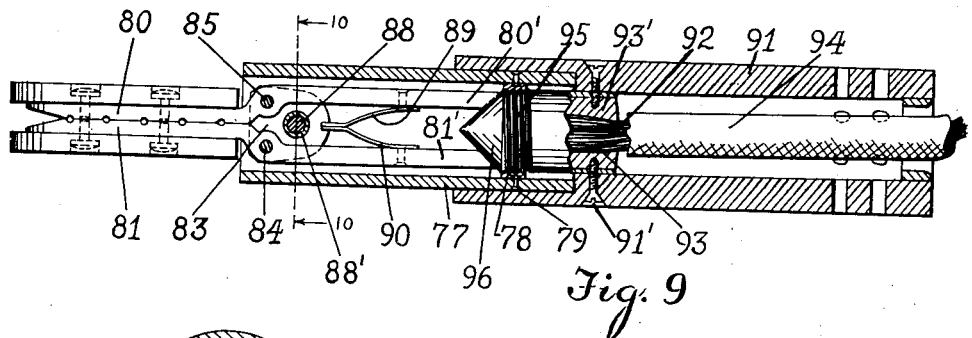
Fig. 9 is a longitudinal, vertical, sectional view of the invention showing a further modified form.
Figure 10:
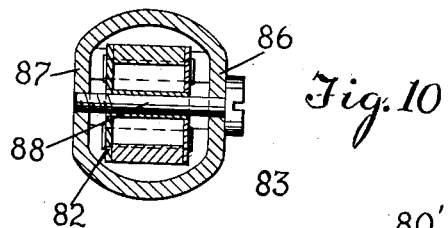
Fig. 10 is an enlarged, sectional view taken on line 10—10 of Fig. 9.
Figure 11:
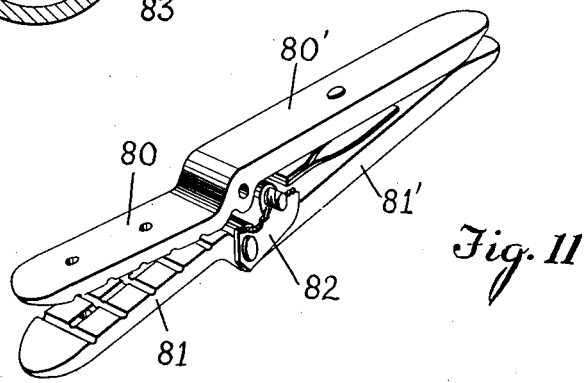
Fig. 11 is an enlarged perspective view of a pair of jaws used in the invention.

In the form shown in Fig. 9 I provide a forward handle section 77 having a metallic internally threaded ring 78 mounted thereon in fixed relation thereto by means of the rivets 79. With this construction I use a clamping mechanism embodying clamping jaws having the forward ends 80 and 81 and the rear ends 80' and 81'. Positioned at opposite sides of these jaws are supporting plates 82 and 83 to which the jaws are pivoted intermediate their ends by means of the pins 84 and 85. Extended through the side walls 86 and 87 of the handle section 77 is a retaining bolt 88 which also passes through the side plates 82 and 83 and a bushing 88'. Secured at their ends to the inner surfaces of the rear ends 80' and 81' of the jaws are leaf springs 89 and 90 which are connected together at their opposite ends and bowed so as to normally tend to approach each other, thus normally tending to separate the forward ends 80 and 81 of the jaws.

Mounted in the rear handle section 91 is a tubular member 93' in which is secured, by solder 92, the bared end 93 of the electric conductor 94, screws 91' serving to retain the member 93' in fixed relation to the handle section 91. A threaded portion 95 is formed on the member 93' forwardly of which is the conical head or nose 96 which serves as a spreading member or wedge.

In operation, upon a relative rotation of the handle sections 77 and 91 relatively to each other in one direction, the nose 96 will, through its engagement with the rear ends 80' and 81' of the jaws, rock the jaws on their pivots so that the forward ends 80 and 81 move into closed relation, as shown in Fig. 9, against the tension of the springs 89 and 90. Upon reverse rotation of the handle sections 91 and 77 the jaws at their forward ends 80 and 81 will move out of engagement in response to the tension of the springs 89 and 90.

Figure 12:
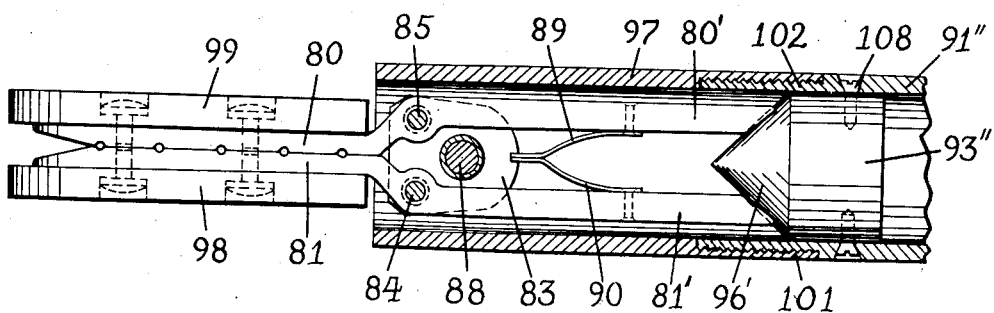
Fig. 12 is a fragmentary, central, longitudinal, sectional view of a further modified form of the invention showing parts in side elevation.

In Fig. 12 I have shown a structure resembling largely the structure illustrated in Fig. 9, but differing therefrom in certain respects. The parts which are identical bearing similarity to the parts shown in Fig. 9. The forward handle section 97 is provided with the cut-away, internally threaded portion 101 into which threads the threaded reduced portion 102 of the rear handle section 91''. Secured to this rear handle section 91'' by means of screws 108 is a tubular member 93'' having the conical nose or head 96'. The electric conductor may be attached to the member 93'' by solder or in any other suitable manner.

In the operation of Fig. 12 a relative rotation of the handle section 91'' and 97 will effect a threading or unthreading of these sections to each other, resulting in an approach or withdrawal of the nose 96' relatively to the ends of the rear ends 80' and 81' of the jaws.

It is believed obvious that instead of the conical construction of the nose shown in Fig. 1 or in Fig. 9 a ball might be used satisfactorily. This thrusting member shown in the various views may be referred to as a wedge member, whether it serves to spread the rear ends of the jaws apart or draw them together. It will be noted in all of the forms that the structure to which the jaws are attached is within the handle and that the spring serves to normally tend to spring the jaws to open position instead of closed position.

It will also be noted, as clearly shown in Fig. 9 and Fig. 12, that the connector to which the cable is attached is entirely enclosed within the handle so that when the jaw section is removed from the connector section the exposed metallic part to which the cable connects is protected against contact with some objects such as a grounded metallic part.

What I claim as new is:

1. In an electrode holder of the class described, a pair of jaws pivotally mounted intermediate their ends and adapted for movement into relative approach at their forward ends for gripping an electrode wire therebetween, upon movement of the rear ends of said jaws into relative approach; a tubular handle for supporting said jaws; means enclosed by said tubular handle movable into engagement with the rear ends of said jaws for forcing the forward ends thereof into relative approach.

2. In an electrode holder of the class described, a pair of jaws pivotally mounted intermediate their ends and movable at their forward ends into relative approach for gripping an electrode wire therebetween, the rear ends of said jaws moving into relative approach upon the movement of the forward ends of said jaws, into relative approach; a tubular handle for supporting said jaws and enclosing the rear ends thereof; and engagement means enclosed by said handle and movable relatively to and in engagement with the rear ends of said jaws for forcing the same into relative approach.

3. In an electrode holder of the class described, a pair of jaws pivotally mounted intermediate their ends and movable at their forward ends into relative approach for gripping an electrode wire therebetween, the rear ends of said jaws moving into relative approach upon the movement of the forward ends of said jaws, into relative approach; a tubular handle for supporting said jaws and enclosing the rear ends thereof; and engagement means enclosed by said handle and movable relatively to and in engagement with the rear ends of said jaws for forcing the same into relative approach, said handle comprising a pair of sections; and means operable upon relative rotation of said handle sections, for actuating said engagement means.

4. In an electrode holder of the class described, a pair of jaws pivotally mounted intermediate their ends and movable at their forward ends into relative approach upon the spreading apart of their rear ends; a handle for supporting said jaws, said handle comprising a forward section and a rear section; threaded means for securing said handle sections together; a spreading member carried by one of said handle sections and engageable with the rear ends of said jaws for spreading the same apart upon relative rotation of said handle sections in one direction.

5. In an electrode holder of the class described, a pair of jaws pivotally mounted intermediate their ends and movable at their forward ends into relative approach upon the spreading apart of their rear ends; a handle for supporting said jaws, said handle comprising a forward section and a rear section; securing means for securing said handle sections together; spreading means carried by the rear handle section engaging the rear ends of said jaws upon the securing of said sections together and effecting an outward thrust thereon upon the relative rotation of said sections.

6. In an electrode holder of the class described, a handle comprising a pair of sections adapted for arrangement in alignment with each other; an electrode gripping mechanism carried by one of said sections; an actuating mechanism for said gripping mechanism carried by and entirely enclosed within the other of said sections.

7. In an electrode holder of the class described, a handle comprising a pair of sections adapted for arrangement in alignment with each other; an electrode gripping mechanism carried by and projecting forwardly beyond one of said sections; means carried by the other of said sections for connection to an electric conductor; an actuating mechanism for said gripping mechanism carried by said other of said sections for actuating said gripping mechanism and establishing electrical connection between the same and said connection means, said actuating mechanism and said connection means being entirely enclosed by said other of said sections.

8. In an electrode holder of the class described, a handle comprising a pair of sections adapted for arrangement in alignment with each other; means carried by and entirely enclosed within one of said sections for connection to an electric conductor; electrode engaging and supporting means carried by the other of said sections; and means for securing said sections together and establishing connection between said electric conductor connecting means and said electrode engaging and supporting means.

9. An electrode holder of the class described, comprising: a forward tubular handle section; a pair of jaws pivotally mounted intermediate their ends on said handle section and adapted, at their forward ends, for movement into relative approach for gripping an electrode therebetween upon the spreading of the rear ends of said jaws, the rear ends of said jaws being enclosed by said handle section; a rearward handle section rotatable relatively to said forward handle section and in alignment therewith; a wedge member movable axially of said handle sections into engagement with the rear ends of said jaws for spreading said rear ends apart and forcing the forward ends together; means, upon relative movement of said sections, for moving said wedge member axially of said sections into engagement with the rear ends of said jaws; and resilient means for moving said rear ends of said jaws into relative approach upon release of the thrust delivered to said jaws by said wedge member.

10. An electrode holder of the class described, comprising: a forward tubular handle section; a supporting structure mounted in said handle section; a pair of gripping members pivotally mounted intermediate their ends on said supporting structure, the forward portions of said jaws projecting forwardly beyond said handle section and the portion of said jaws rearwardly of the point of mounting being enclosed by said handle section; a rearward handle section in alignment with said forward handle section; threaded means for rotatively connecting said handle sections together; and a wedge member within and movable axially of said handle sections for engaging the rear ends of said jaws and effecting relative movement of the same.

11. An electrode holder of the class described, comprising: a forward tubular handle section; a supporting structure in said handle section; a pair of gripping jaws pivotally mounted intermediate their ends on said supporting structure, said jaws rearwardly of the point of pivot being enclosed by said handle section and the forward ends of said jaws projecting forwardly beyond said handle section and movable into close approach for gripping an electrode therebetween; a rearward handle section in alignment with said forward section and rotatable relatively thereto; threaded means for connecting said handle sections together; and means movable axially of said handle sections, upon relative rotation of the same in one direction, for forcing the forward ends of said jaws into relative approach.

12. In an electrode holder of the class described, a forward tubular handle section; a pair of gripping jaws pivotally mounted intermediate their ends on said handle section, the portion of said jaws rearwardly of said pivot extending within said section and the forward ends of said jaws projecting forwardly beyond said handle section and being movable into relative approach for gripping an electrode therebetween; a rearward handle section in axial alignment with said forward section and rotatable relatively thereto; means enclosed within and axially movable of said handle sections for engaging the rear of said jaws and moving the forward ends of said jaws into relative approach upon relative rotation of said handle sections in one direction; and means normally urging the forward ends of said jaws into separated relation.

PHILIP BOURQUE.